Friedrich W. Hefer
William W. Witt
Lee E. Siems
INVENTORS

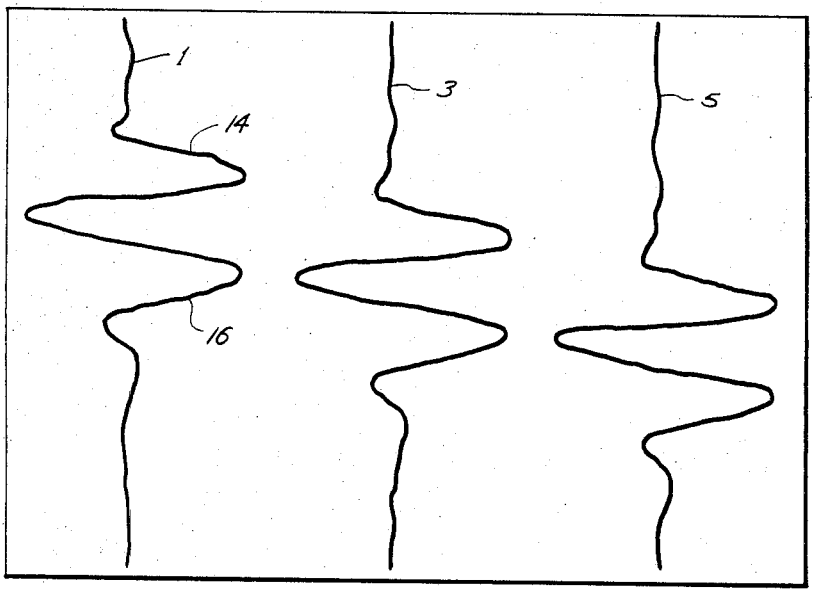

BY
Arnold and Roylance
ATTORNEYS

Oct. 24, 1967 F. W. HEFER ETAL 3,349,407
SEISMIC DISPLAY APPARATUS
Filed June 23, 1965 7 Sheets-Sheet 3

Friedrich W. Hefer
William W. Witt
Lee E. Siems
INVENTORS

BY
Arnold and Roylance
ATTORNEYS

Oct. 24, 1967 F. W. HEFER ETAL 3,349,407
SEISMIC DISPLAY APPARATUS
Filed June 23, 1965 7 Sheets-Sheet 4

Friedrich W. Hefer
William W. Witt
Lee E. Siems
INVENTORS

BY
Arnold and Roylance
ATTORNEYS

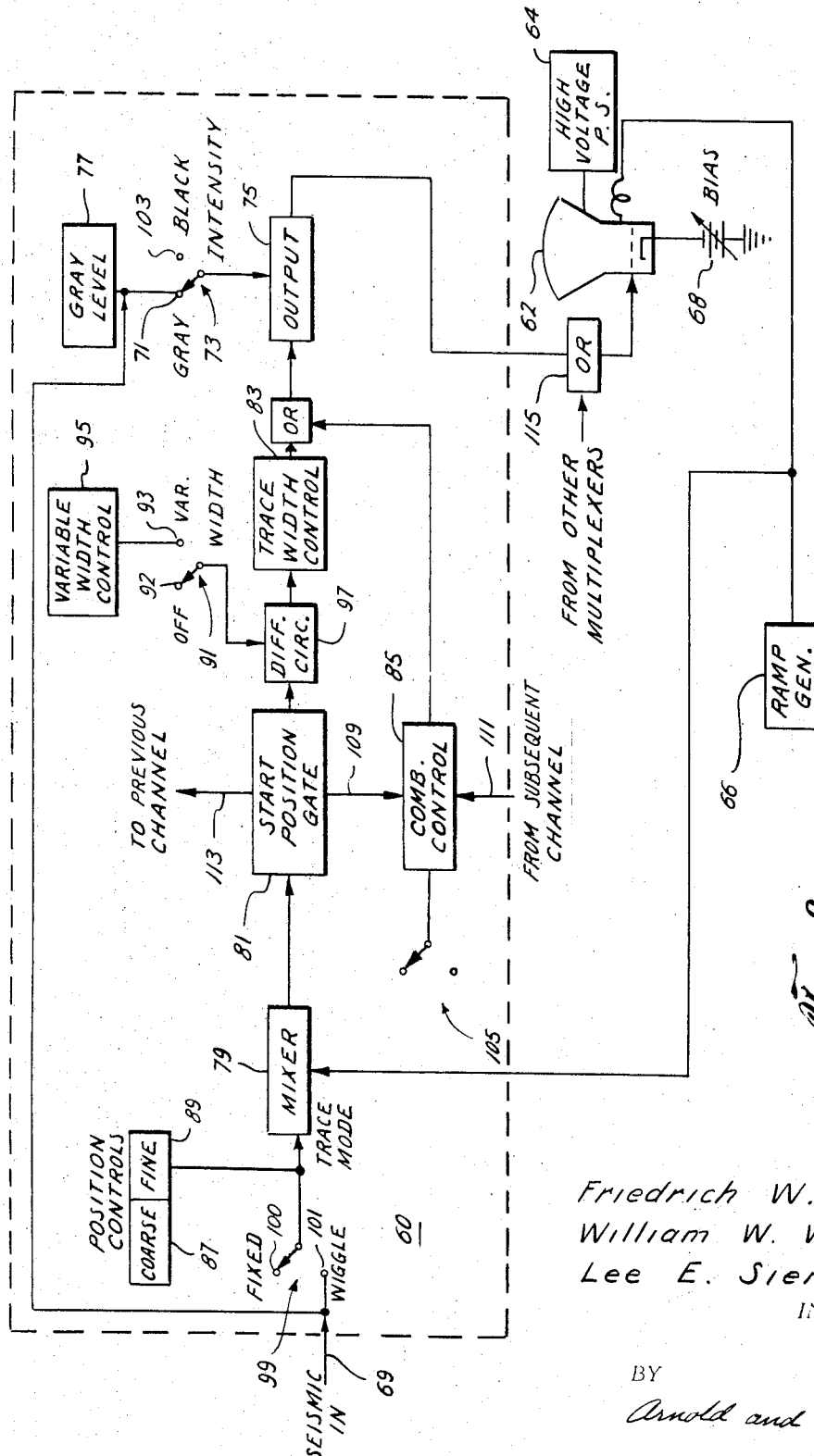

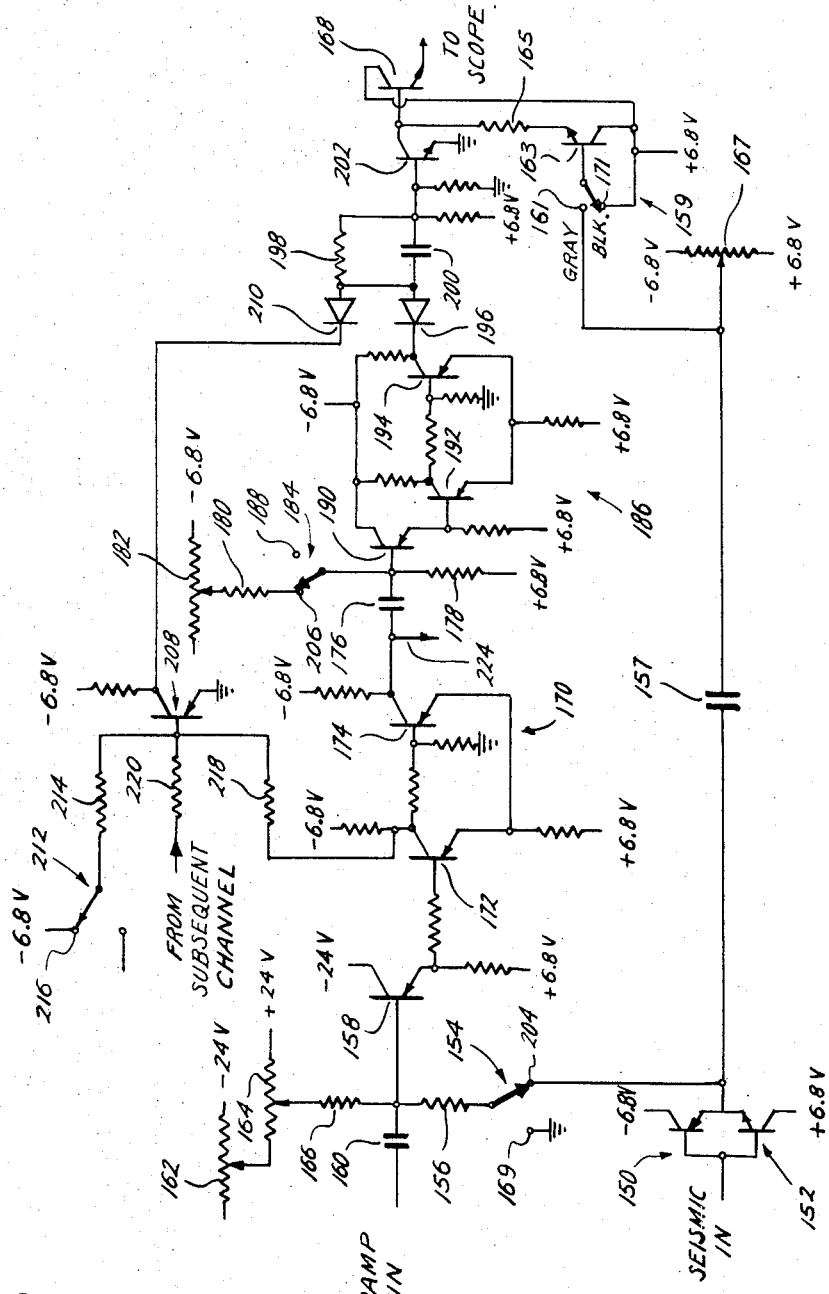

Oct. 24, 1967 F. W. HEFER ET AL 3,349,407
SEISMIC DISPLAY APPARATUS
Filed June 23, 1965 7 Sheets-Sheet 7

Friedrich W. Hefer
William W. Witt
Lee E. Siems
INVENTORS

BY
Arnold and Roylance
ATTORNEYS

3,349,407
SEISMIC DISPLAY APPARATUS

Friedrich W. Hefer, William W. Witt, and Lee E. Siems, Houston, Tex., assignors to Geo Space Corporation (a division of Western Equities Inc.), Glenmont, Tex., a corporation of Nevada
Filed June 23, 1965, Ser. No. 466,298
10 Claims. (Cl. 346—110)

This invention relates to seismic geophysical recordings and more specifically to the production of improved seismograms through the conversion of electronic seismic signals to produce displays of improved readability and the projection of these displays to a recording medium.

In forming seismogram records in the past, geophones placed at normally even-spaced stations have received the echoes of reflected or refracted waves produced by a centrally placed impact, or shot, shock source as affected by sub-surface stratum conditions. When converted to electrical waves, the resultant signal, referred to as a seismic signal, from each geophone has been used to drive a galvanometer movement attached to a recording pen. A strip chart driven past and in contact with the pen has been used to make a permanent record.

By synchronizing the signals from the geophones to the same time base, it has been possible to drive a group of pens to produce a composite presentation. Such a presentation is referred to as a seismogram.

An improved recording technique has been developed for making seismograms using mirrors mounted on galvanometer movements and reflecting a light beam in accordance with the seismic signals onto a light-sensitive paper.

But, regardless of the technique used to produce the seismogram of the character described, it is often difficult to see subtle nuances, and hence fully interpret the seismograms. Also, the seismograms become very hard on the eyes for prolonged periods of study. Therefore, the the present invention describes the creation of signals for producing seismograms considered by many as being much easier to read.

Further, by their very nature, these improved signal displays are not compatible for recording in a manner similar to that described for the usual seismic signals. Therefore, a system is described for easily obtaining suitable recordings of the newly produced types of signals.

It should be further noted that the invention described herein still permits the production and recordation of the familiar seismograms, and for optimum flexibility, further provides for the superimposing of the normal seismic (wiggle) trace with each of the new types of traces created.

Therefore, the invention described herein generally is the method of and apparatus for permanently recording seismograms, which comprises:

establishing a repetitive ramp sweep signal of sufficient duration such that a plurality of seismic signals may be displayed, applying said sweep signal to an orthogonal deflection element of an oscilloscope, receiving a seismic signal and gating it appropriately so that said seismic signal has the same corresponding position relation on successive cycles of said sweep signal, establishing a variable density signal from said seismic signal capable of varying the intensity of the oscilloscope display and gating it appropriately so that said density signal has the same corresponding position relation of said sweep signal on successive cycles thereof as said seismic signal, or establishing a variable area signal from said seismic signal, said area signal being defined by the difference between said seismic signal and a reference base signal and wherein the area represented by said difference on an oscilloscope display may be set to varying levels of intensity including black and gating it appropriately so that said area signal has the same corresponding position relation of said sweep signal on successive cycles thereof as said seismic signal, selecting among said seismic signal, said density signal, said area signal, said seismic and density signals superimposed, and said seismic and area signals superimposed for application to a control grid of the oscilloscope, thereby establishing a seismogram image thereon, receiving the reflected image therefrom with a mirror system, projecting the image received from the mirror system through a lens for sharply focusing the image at the real foci of said lens, and recording the seismogram image on a light sensitive recording medium placed at the real foci position of said lens, and moving said medium at a constant velocity in a direction approximately perpendicular to the projected image.

Further, also described are a method of and the apparatus for subsequently repeating the same process for another group of signals, for instance, from another series of geophone stations, at another location on the recording medium. It is often desirable to do this in interpreting a series of reflections received along one path from the initiating impact source along with a series of reflections received along another path from the initiating impact source.

More particular description of the invention may be had by reference to the embodiments thereof which are illustrated in the appended drawings, which form a part of this specification. It is to be noted however, that the appended drawings illustrate only a typical embodiment of the invention and therefore are not to be considered limiting of its scope, for the invention will admit to other equally effective embodiments.

In the drawings:

FIG. 1 is an enlarged presentation of a wiggle seismogram capable of being established by this invention.

FIG. 2 is an enlarged presentation of a variable density seismogram capable of being established by this invention.

FIG. 8 is a partial simplified block diagram of one embodiment of the invention.

FIG. 9 is a partial simplified schematic diagram of one embodiment of the invention.

Figure 3:
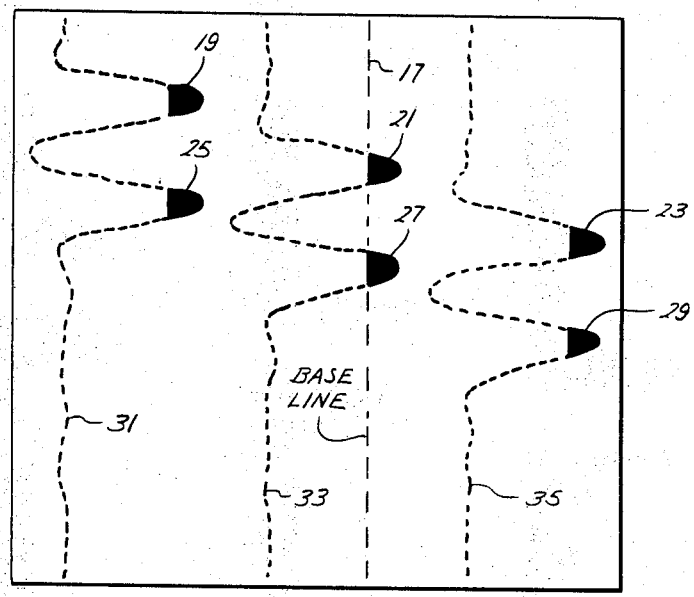
FIG. 3 is an enlarged presentation of a variable area seismogram capable of being established by this invention, the base line being set close to the peak excursions.

Seismograms are normally represented in strip chart form by a plurality of wiggle traces, each trace made by a stationary pen in relation to a moving chart. Each pen is driven by a seismic signal received by a geophone and transformed into an electrical signal. With the foreknowledge of the spacing of the geophones, a pattern can be interpreted from the multiple station signals to reveal geophysical subsurface information.

Some geologists and other interpreters of seismograms have difficulty reviewing the typical seismogram described above made of wiggle traces. Therefore, it has been found that other types of representations may be derived from the typical A-C seismic voltage signals generated at the geophones.

Described herein is an electronic circuit for developing from a typical seismic input voltage two fundamentally different types of representations, namely variable density and variable area, by using auxiliary circuits together with an oscilloscope. Since many interpreters of seismograms still prefer the familiar wiggle traces, the circuit also makes available through the optical and strip-chart recording system a wiggle trace display.

Further, the circuit described herein is extremely flexible, permitting viewing of more than one of the types of displays simultaneously. The interpreting geologist may then select the type of display which is most satisfactory for him to read.

FIGS. 1 through 7 illustrate variable signals 1, 3 and 5 that may be made available through selecting various combinations of circuit operation. For instance, FIG. 1 merely shows the usual wiggle trace patern. A blow-up of only three traces from three successive seismic signal sources are shown, although it is not unusual to have 24 or even 48 different traces from different sources shown together side by side. FIG. 2 shows a variable density signal (signals 7, 9 and 11) for each of the three corresponding wiggle traces shown in FIG. 1. This merely means that as the signal becomes more peaked toward the right side of the diagram in FIG. 1, the darker becomes the shade of gray of the corresponding trace in FIG. 2. Dark gray areas 13 and 15, for example, correspond to the peaks 14 and 16 of the wiggle traces shown in FIG. 1.

Figure 4:
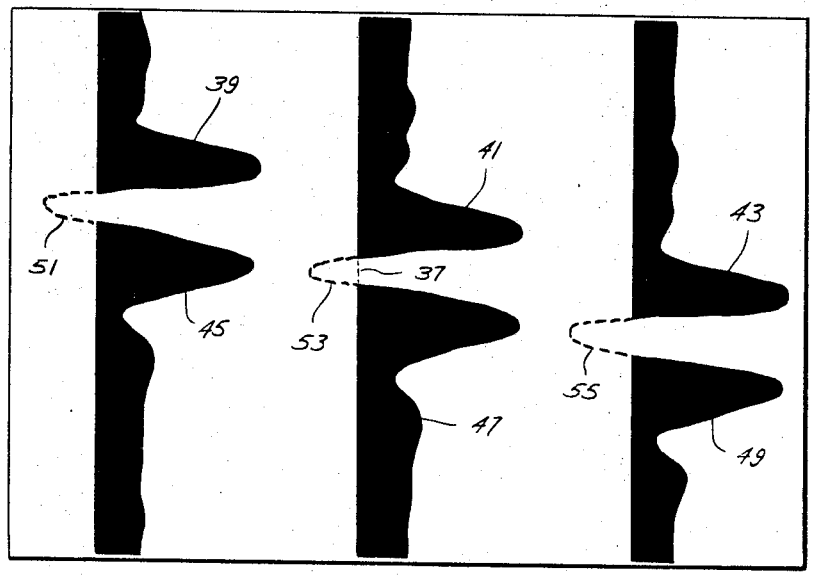
FIG. 4 is an enlarged presentation of a variable area seismogram capable of being established by this invention, the base line being set far from the peak excursions.

FIGS. 3 and 4 show variable area signals for each of the corresponding wiggle traces shown in FIG. 1. Base line 17, which is set just below the peak of the wiggle line 3, defines dark areas 21 and 27. Similarly, base lines 19, 25, 23 and 29 for the other two traces so that only the areas between the base lines and the peaks are reflected on the face of the oscilloscope.

The dotted lines 31, 33 and 35 represent the remainder of the traces that do not appear on the scope at all, since they fall to the left of the base line 17 and the equivalent base line counterparts for the other two traces.

FIG. 4 shows a type of display similar to FIG. 3, but in FIG. 4 the base line 37 is considerably displaced to the left of the peaks shown on the right side of the traces on the diagram. The other two traces also have their base line similarly far removed from their respective peaks. Therefore, areas 39, 41, 43, 45, 47 and 49 appearing on the face of the oscilloscope are much larger than the corresponding areas appearing in FIG. 3, where the base line was considerably closer to the peaks appearing on the right side of the diagram.

Notice now that the wiggle trace lines 51, 53, and 55 in FIG. 4, which do not appear on the face of the oscilloscope because they are to the left of the respective base lines, are much shorter trace lines than the corresponding trace lines 31, 33 and 35 appearing in FIG. 3.

It should be further noted that the overall impression for the FIG. 4 display is one of darkness and that the overall impression of the FIG. 3 display is one of lightness when the intensity of the scope is set for maximum for all of the respective signals between the base lines and the peaks of the traces.

Figure 5:
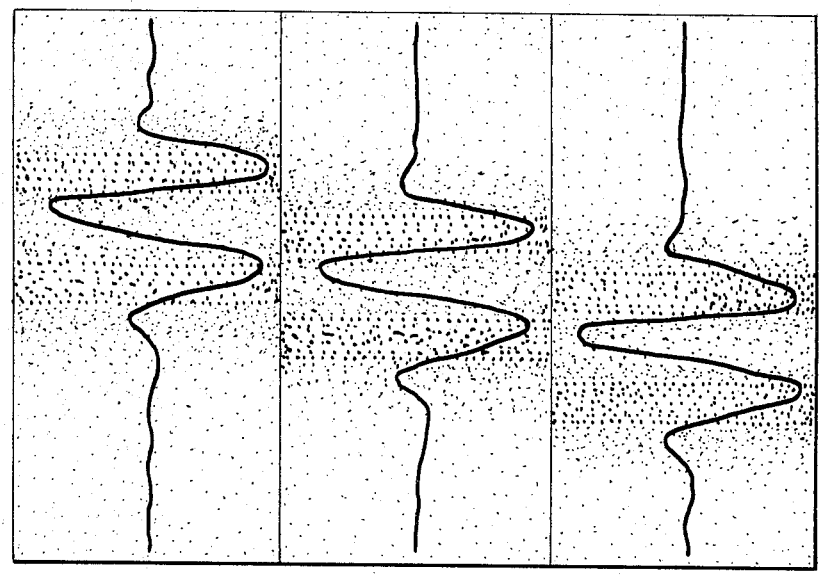
FIG. 5 is an enlarged presentation of a superimposed wiggle and variable density seismogram capable of being established by this invention.
Figure 6:
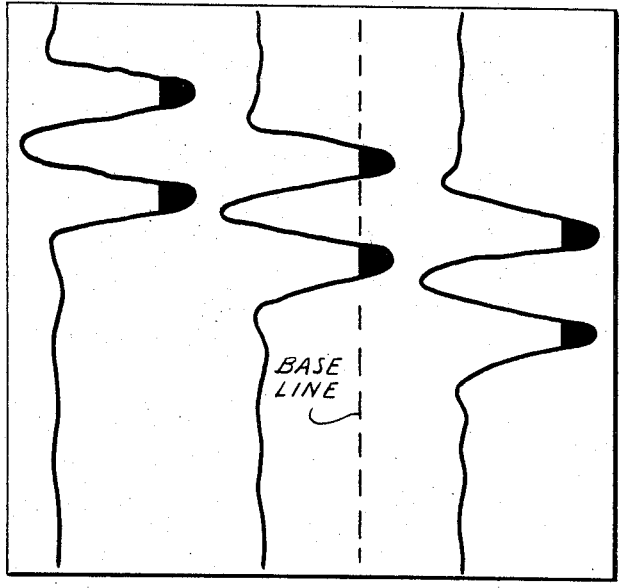
FIG. 6 is an enlarged presentation of a superimposed wiggle and variable area seismogram capable of being established by this invention, the base line being set close to the peak excursions.
Figure 7:
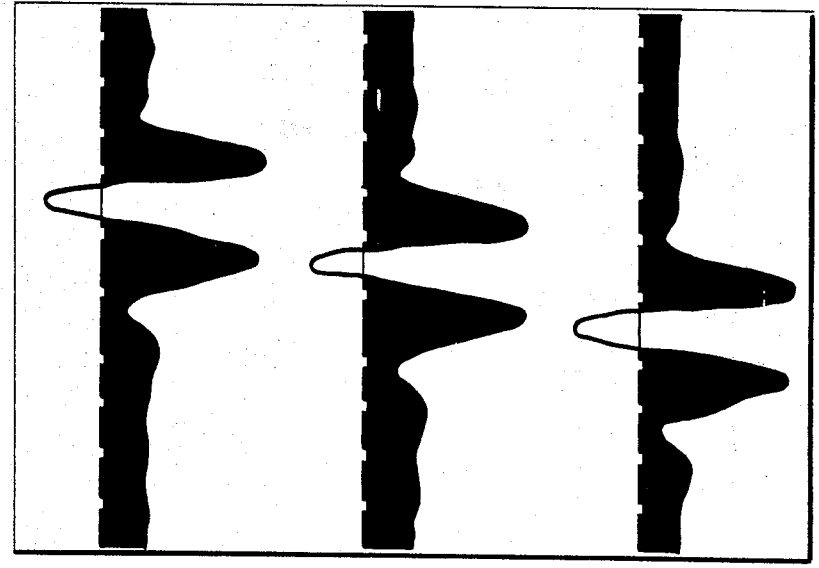
FIG. 7 is an enlarged presentation of a superimposed wiggle and variable area seismogram capable of being established by this invention, the base line being set far from the peak excursions.

FIGS. 5, 6, and 7 show various forms of composite, or combination, traces that may be made available by the apparatus described herein. The FIG. 5 trace depicts a combination of the wiggle traces appearing in FIG. 1 with the variable density trace appearing in FIG. 2, the two types of traces for each seismic signal being superimposed.

FIG. 6 and FIG. 7 composite, or combination, traces show the wiggle traces combined with the variable area traces. The FIG. 6 illustration depicts a display where the base lines are very close to the peaks on the right side of the display so that the overall appearance is one of lightness, such as in FIG. 3. By contrast, FIG. 7 shows, for each signal, a wiggle trace combined with a large variable area trace, i.e. with the base line far removed from the peak excursions on the right. Such a display gives an overall impression of darkness or blackness.

Turning now to FIG. 8, a simplified block diagram of a trace multiplexer card 60 is shown as connected to a cathode ray oscilloscope tube as a display unit. Oscilloscope 62 may be of any typical construction having at least one orthogonal deflection element and a control grid element. High voltage power supply 64 is connected to the post-anode of the oscilloscope for providing the acceleration voltage for the impinging electrons.

Ramp generator 66, which produces a repetitive ramp saw-tooth signal, is connected to the orthogonal deflection element, normally the horizontal deflection yoke. The same output from this ramp generator is used for controlling the operation of multiplexer card 60 and the multiplexing cards used in conjunction therewith, as will be described below.

Bias control 68 is connected to the cathode of oscilloscope 62 to provide the overall intensity control of the impinging electrons onto the face of the oscilloscope. Control 68 may be made variable so that the overall intensity appearance of the oscilloscope display may be adjusted.

As previously mentioned, there are multiple signals multiplexed into the control grid of the oscilloscope. But, for simplification purposes only one of the trace multiplexer cards 60 is shown. It is essentially identical, however, to each of the other multiplexer cards that is used.

A seismic input signal is applied on line 69 to the card, the seismic input signal being an A-C voltage containing the reflected signal from a single station geophone.

Amplifier 75 is turned on and off in accordance with the signals applied through mixer 79, start position gate 81, differentiating circuit 97, trace width control 83, and combination control 85. Various combinations of switching and potentiometer adjustments select the particular mode of operation.

For all modes of operation mixer 79 is controlled by the same output from ramp generator 66 as the output applied to the orthogonal deflection element of oscilloscope 62. The position of the output from output amplifier 75 of the particular card 60 shown with respect to the outputs from the other cards that are applied to OR circuit 115 is determined by the bias level adjustment of the other signals added to the ramp voltage at mixer 79. These signals, which are really bias signals, determine the point along the ramp voltage at which start position gate 81 (which may be a Schmitt trigger) operates, and hence, at what point in time the output from this particular card 60 is produced. The point may be shifted as directed by coarse and fine position controls 87 and 89.

The output from start position gate 81 is applied to differentiating circuit 97, which, in turn, determines the operation of trace width control 83. Circuit 83 may be similar in construction to start position gate 81. The time duration of the operation of trace width control 83 may be controlled through width switch 91.

In position 92, the OFF position of width switch 91, the signal applied from start position gate 81 is prevented from triggering trace width control 83. However, when width switch 91 is placed in position 93, a variable width control circuit 95 determines the bias setting of the output from differentiating circuit 97, and hence the duration that trace width control 83 is in conduction.

If it is desired to display the wiggle signal on the face of oscilloscope 62, the input seismic signal on line 69 is applied through trace mode switch 99 with the switch in wiggle position 101. Switch 105 is placed in the OFF position, which removes combination control 85 from the operation of the circuit. With switch 99 in the wiggle position signal 69 is added in mixer 79 along with the D-C signal from position controls 87 and 89 onto the ramp signal from generator 66.

The ramp generator produces a repetitive cycle sawtooth signal, the leading edge of which rises in reset fashion substantially instantaneously and the trailing edge of which descends to the maximum negative value at a substantially constant rate.

The ramp generator repetitive cycle is very fast with respect to changes in the wiggle trace presentation, on the order of 4000 cycles per second compared to about 10 cycles per second. Hence, seismic input 69 may be thought of as a slight variation of the bias voltage of the ramp generator.

On each ramp cycle, the start, or on, point of start position gate 81 is varied slightly in accordance with the relatively slow changing seismic signal. This slight change of position is reflected through differentiating circuit 97, trace width control 83, and output amplifier 75 in terms of a slight change of position on the output of the oscilloscope.

Since the on time of trace width control 83 may be made very short, the output signal on the face of the oscilloscope for the instant channel may be thought of as a dot. The next ramp generator sweep causes another dot, at a slightly different position. Over a period of time, these dots form a pattern defining a wiggle trace, which may be recorded on a strip chart as described below.

Simultaneous operation of other cards 60 connected to other seismic signals 69, but controlled by the same ramp generator output (biased at different operating points along the ramp voltage) will result in a plurality of such outputs. These outputs may be connected in OR circuit 115 to produce a series of channels simultaneously on the face of oscilloscope 62.

As previously discussed, one type of display that may be produced by operation of the circuit is the variable density, or variable intensity, display. A variable density trace is produced by placing switch 105 from the OFF position, enabling combination control 85. At the on time position for start position gate 81, a signal 109 is applied to circuit 85 to produce an output from circuit 85. At the on time position for the circuit 81 of the card operating next subsequent in time to the operation of the instant card, a signal 111 is produced which is applied to circuit 85. This signal cuts off the output from card 85. Therefore, an output is produced covering the complete period from the turn on point of one card to the turn on point of the next, rather than just a dot as with the wiggle trace operation.

The signal causes output amplifier 75, through OR circuit 98, to be turned on. The D-C amplitude of the output from amplifier 75 during the on period is determined by the signal applied through intensity switch 73. When switch 73 is set in gray position 71, the seismic input 69 is applied thereto, effectively causing the amplitude of the output of amplifier 75 to vary from one sweep of ramp generator 66 to the next in accordance with the excursion variations of the seismic signal. The variations in the amplitude of the output from amplifier are reflected in the change of the density or intensity of the display appearing on the trace of the oscilloscope.

Positive excursions cause the D-C amplitude to increase and negative excursions cause the D-C amplitude of amplifier 75 to decrease. The larger the excursions the greater the effect on the amplitude of the amplifier output. The resultant effect of an increase in the amplitude of the output of amplifier 75 is a darker pattern upon the face of oscilloscope 62, whereas a decrease in the output amplitude is reflected as a reduction in the intensity of the display on the face of the oscilloscope.

An auxiliary gray level control 77 is also connected to contact 71 of intensity switch 73 for adjusting the entire range of intensity of the display from output 75 of card 60 to the desired level.

Two cards 60 operating in conjunction with one another are used to achieve a variable area trace. The first card operates with its switch 99 in the FIXED position 100, with switch 73 in BLACK position 103, with switch 105 removed from the OFF position (enabling combination control 85), and with switch 91 placed in OFF position 92 (preventing operation of trace width control 83).

On the second card, the card biased for operation of its start position gate 81 next in time subsequent to the first card, switch 99 is placed in WIGGLE position 101. An output coinciding in time with the switching on of its start position gate 81 is applied to combination control 85 of the first card (at the input 111 thereof).

Output amplifier 75 of the first card is turned on when the ramp sweep turns on start position gate 81. Notice that this turn-on occurrence is at the same position for each successive sweep of the ramp generator output. The turn-on action is through combination control 85, as explained above in the producing of the variable density trace. The output amplitude from amplifier 75 is at its highest (resulting in the blackest possible trace on the face of the scope).

When start position gate 81 of the second card is turned on, a turn off signal is applied through combination control 85 of the first card to output 75 of the first card, terminating the display on the face of the oscilloscope. Notice that this turn-off occurrence is *not* at the same position for each successive sweep of the ramp generator output, but is dependent upon variations in the seismic signal from sweep to sweep.

Also, it should be noticed that through position controls 87 and 89 the timing of either the turn-on signal (the baseline determining signal) or the turn-off signal may be moved with respect to the other.

It is possible, and oftentimes desirable, to superimpose more than one of the three types of displays on the face of the oscilloscope. For instance, the wiggle trace superimposed on the variable density display gives emphasis to the combined display. Likewise, when the base line of the variable area display is moved near the peaks, it may be desirable to fill out the display by superimposing the wiggle trace.

First, consider superimposing the variable density display and the wiggle trace. By appropriate rewiring of cards or switching, it is possible to have the turn-off signal be controlled by the second card in operating time subsequent to the card producing the turn-on signal. The card first in time subsequent to the card establishing the turn-on time (i.e., the card between the two cards controlling the width of the variable density display) may be set for wiggle operation. By combining the variable density output from output amplifier 75 of the first card with the wiggle output of amplifier 75 of the second card in OR circuit 115, a superimposed combination signal is produced.

Notice that even though three cards are used for the production of a superimposed variable density plus wiggle trace, this does not mean a total of three different cards are necessary for producing each channel. The turn off signal for the first channel and the turn on signal for the subsequent channel are complementary voltages and hence may be derived from the same card. Hence, the third card operating in the first channel acts as the first card of the subsequent channel. Therefore, there is only a net use of two cards for each channel.

Consider now combining the variable area display and the wiggle trace. Whenever the seismic trace applied to the second card (the one establishing the turn-off signal in the description of producing a variable area above) swings so that its excursions occur before the turn-on signal, combination control is disabled to prevent the turn-on of output amplifier 75. So long as output amplifier 75 is prevented from being turned on, no trace appears on the scope, thereby eliminating the wiggle trace occurring in time before the base line from being shown.

The card operating with respect to the wiggle trace (i.e., the card producing the turn-off signal) does produce an output from its own output amplifier 75 of the first card. When the outputs of the first and second cards are combined in OR circuit 115, a superimposed, or combined, output display is produced on the face of the oscilloscope such that the entire wiggle trace is shown, even that which occurs before the base line.

OR gate circuit 115 is used to receive similar signals from other multiplexer cards 60, as selected by appropriate switching. The composite display on oscilloscope 62 is a composite of all of the signals representing all of the seismic inputs applied to all of the cards, at timed position along the sweep voltage in accordance with their individual settings. Ordinarily, of course, all of the multiple parts of the display will be of similar character so as to give a homogeneous presentation.

The bias settings of the ramp generator signals for the circuits are normally set so that there is no overlapping of channels. However, if overlap is desired, then the timing of start position gate 81 may be adjusted to allow this.

A specific simplified schematic diagram capable of operating as described above is shown in FIG. 9. The seismic A.-C. voltage representing the reflected signal from the geophone station is applied to a balanced isolation element, such as emitter followers 150 and 152. Emitter follower 150 may be a pnp transistor having its collector biased at a negative voltage, typically —6.8 volts. Emitter follower 152 may be an npn transistor having its collector biased at a positive voltage, typically +6.8 volts. The two emitters are connected together to produce a resultant output signal with both positive and negative excursions, without any clipping or changing of the biased reference level.

The output for emitter followers 150 and 152 are connected to switch 154 and capacitor 157. The signal applied to capacitor 157 is, in turn, connected to switch 159. Capacitor 157 effectively removes any D-C components that may exist as a result of imbalance in emitter followers 71 and 73.

When switch 159 is placed in position 161, the signal from capacitor 157 is applied directly to the base of transistor 163, an npn transistor having its collector biased at +6.8 volts. Also connected to capacitor 157 and contact 161 of switch 159 is the movable sweep arm of potentiometer 167. D-C voltages are applied to opposite ends of potentiometer 167 such that at one end —6.8 volts is applied and at the other +24 volts is applied. Therefore, any biased voltage between these two levels may be applied to the A-C signal from capacitor 157.

By placing switch 159 to position 161, the signal applied to the base of transistor 163 causes transistor 163 to operate below saturation so that signals on the emitter of transistor 163 have a biasing effect on the base of transistor 168 for controlling the amplitude of the signal produced therefrom. Large positive signals will cause transistor 168 to produce a larger bias and small signals will cause transistor 168 to produce a smaller bias.

When switch 159 is placed in black position 171 the maximum amount of positive voltage is applied to the base of transistor 163 driving it to saturation, thereby applying the largest voltage bias to the base of transistor 168 thereby causing it to produce maximum D-C amplification.

As explained above the output from the emitter of output amplifier transistor 168 is applied through an OR gate (not shown) to a control grid of an oscilloscope, the saw-tooth sweep signals from a ramp generator being applied to an orthogonal deflection element. It is readily apparent how the position of the sweep arm on potentiometer 167 determines the amplitude of the output from the card and hence the gray level of the oscilloscope display when switch 159 is placed to position 161.

The seismic signal from emitter followers 150 and 152 may also be applied through switch 154 and resistor 156 to the base of transistor 158, an emitter follower operating Class A. Also applied to the base of 158, through capacitor 160, is the same ramp input signal that is applied to the orthogonal deflection element of the oscilloscope.

A biased voltage developed across series resistors 162, 164 and 166 is applied to the base of transistor 158 through another connection thereto. Both resistors 162 and 164 may be variable so that any voltage between the levels of —24 volts and +24 volts may be selected. This determines the point at which the ramp input on capacitor 160 becomes negative enough to cause start position gate 170 to conduct. Ultimately, this setting determines the place, or position, on the whole of the multiplexing display on the oscilloscope where the output from the instant card is shown.

Switch 154 may be placed in position 169 to remove the seismic signal from the emitters of transistors 150 and 152 so that the only thing that controls the conduction of start position gate 170 are the voltages applied through 166 and 160. The output from transistor 158 is taken from its emitter and applied to start position gate 170, which comprises transistors 172 and 174.

The operation of the start position gate may be thought of as lasting from the time the sweep voltage causes circuit 170 to conduct until the time of sweep reset. The time of the operating occurrence of circuit 170 is set by controls 162 and 164 and, when connected in the circuit, by the signal applied through switch 154. Although this is an A-C signal, it is slow changing with respect to the sweep time and may be thought of as only a change in D-C level from sweep to sweep of the ramp generator output.

Transistors 172 and 174 are of conventional Schmitt trigger design. The output from start position gate 170 is taken from the collector of transistor 174 and applied to capacitor 176, one-half of a differentiating circuit with resistor 178. Resistor 178 is connected between the output side of capacitor 176 and a +6.8-volt bias. Resistor 180 and variable resistor 182 are connected between the output side of capacitor 176 and a —6.8-volt bias through switch 184.

When the Schmitt trigger comprising transistors 172 and 174 turns on, a negative pulse is produced from the differentiating circuit, the delay, or recovery, time being determined by the time constant of capacitor 176 and resistor 178. Therefore, the pulse has a fixed amplitude and a tapered width, or duration, dimension, as the voltage stabilizes to a neutral voltage setting.

The output from the differentiating circuit is applied to transistor 190, a pnp emitter follower connected to trace width control circuit 186. Circuit 186 may be a conventional Schmitt trigger comprising transistors 192 and 194 and their associated components.

As with start position gate 170, trace width control circuit 186 is on during the time that the input signal (in this case, the negative pulse) exceeds the operating value of the circuit.

The differentiating pulse input to the circuit may be added to a bias voltage by placing switch 184 in position 206 and adjusting the sweep arm on resistor 182 so that it may cause circuit 186 to be on for a short period of time, for a relatively long period of time (biased at a point near the neutral recovery line where the pulse width is wide), or not at all. The later condition also occurs when switch 184 is placed in position 188. Without the aid of a negative voltage bias adjustment, the pulse from the differentiating circuit is not sufficiently large in amplitude in a negative direction to cause transistor 190 to conduct.

The output from transistor 194 is from the collector, which is applied to diode 196. Diode 196 in turn is applied to a parallel combination of resistor 198 and capacitor 200, the combination being applied to the base of transistor 202. The output from transistor 202, in turn, is applied to the base of the output of transistor 168.

When switch 154 is placed in position 204, the output from emitter followers 150 and 152 is applied to the base of transistor 158 through resistor 156. This connection effectively mixes the A-C seismic signal with the ramp generator signal and the bias voltage applied across resistor 166. The signal has only slight control over the operation of the start position gate from sweep to sweep and for most purposes can be considered as being passed through start position gate 170, the differentiating circuit, trace width control 186, diode 196, and output amplifiers 202 and 168. When the switches are thus connected the output from amplifier 168 to the oscilloscope is a dot of a size determined by the time trace width control 182 was conducting. A series of these dots over a series of sweeps of the ramp in signal defines a recordable seismic wiggle trace. When it is desired to view the wiggle trace, switch 159 is normally left in the black 171 position so that the trace is presented with maximum intensity.

For display of variable density or variable area a second circuit, similar to the one shown in FIG. 9, is employed. Also, the circuit comprising transistor 208 in the instant circuit and the associated components are used.

The collector output of pnp transistor 208 is connected to the cathode of diode gate 210, connected as an OR circuit with diode gate 196. Three resistors 214, 218 and 220 are connected to the base of transistor 208. Resistor 218 is connected to the collector of transistor 172, resistor 220 is connected to a circuit biased for operation subsequent in time to the circuit shown, and resistor 214 is connected to a switch 212. A fixed voltage sufficiently negative to cause transistor 208 to conduct fully may be selected by switch 212. For the transistor shown, this voltage is −6.8 volts.

When it was desired to view only the wiggle trace, switch 212 was closed to position 216, thereby applying a negative voltage to the base of transistor 208. This negative voltage caused the transistor to saturate and clamped the output thereof to ground. This prevented any other signal that might have been applied to the base of transistor 208 from affecting the operation of the overall circuit.

To operate the circuit for viewing of a variable density display, switch 212 is switched from position 216. When transistor 172 is not conducting, the collector of transistor 172 is held at a negative voltage, thereby causing transistor 174 to saturate and clamping its output to ground.

When transistor 172 conducts (at the on point of the start position gate), a positive-going voltage is established on its collector. This voltage is applied through resistor 218 to the base of transistor 208, cutting it off. When transistor 208 no longer conducts, its collector becomes set at a negative voltage sufficiently large to trigger diode gate 210, and hence output transistors 202 and 168.

The complementary output to the output on the collector of transistor 172 is output 224 on the collector of transistor 174. That is, when the collector of transistor 172 is positive-going toward ground, output 224 is negative-going toward −6.8 volts by the cut off action of transistor 174. An output similar to output 224 on the next card subsequent in operation time to the operation of the instant card is applied to resistor 220.

After transistor 208 is turned off by the action of the voltage applied across resistor 218 it remains off until a signal is received at resistor 220, which turns it on. Therefore, the time duration between the triggering of circuit 170 of the instant circuit and the triggering of circuit 170 of the next subsequent circuit determines the width of the variable density channel presentation appearing on the oscilloscope face.

When variable density is the desired operation, switch 159 is placed in gray position 161 to allow the intensity of the display to vary, as described above.

An alternate operation for variable density operation using only one card is achieved by the biasing of operation of circuit 186 so that it remains on for almost the entire duration of the recovery period of the applied differentiating pulse. Such an operation would more than likely reduce the size of the channels displayed on the face of the oscilloscope such that there would be blank, or white, areas between the channels.

The operation of the two circuits for producing a variable area display is very similar to the operation for variable density just described. The only differences in the operation are the settings of switch 159 (this time to black position 171 so that the display appears as dark as possible) and the signal applied to resistor 220 is now the wiggle signal from the card operating next in time subsequent to the instant card.

To explain the operation of the second, or subsequent, circuit more fully, it may be recalled in the wiggle trace mode of operation that switch 154 is placed in position 204 so that the operation of start position gate 170 varies slightly from sweep to sweep in accordance with the amount the seismic signal affects the ramp voltage setting. Since output 224 of that card (applied to resistor 220 of the instant card) is dependent on the on time of circuit 170, this determines a variation in time that transistor 208 on the instant card remains off, the voltages and their creation being the same as for the variable density operation described above.

The amount of the variable area display to be shown on the face of the oscilloscope may be varied by a fixed amount by changing the adjustments of resistors 162 and 164 on either the instant circuit or the subsequent one, thereby moving the on and off signals either closer together or further apart, as desired.

Notice that the equipment is perfectly compatible with seismic signals magnetically recorded on tape that may then be simultaneously processed at a central facility, thereby avoiding time delays and transmission problems from multiple field locations, and also avoiding the need for taking more complicated bulky type of recording equipment to the field.

Since the sweep voltage from the same ramp generator is used for each of the channels, i.e. from each of the multiplexing cards 60 operating in conjunction with a different source seismic signal, the multiplexing scheme is greatly simplified when compared to a variable time constant scheme. The system that has been described operates on voltage amplitude settings of the ramp generator as biased by ancillary bias control settings, which make the triggering independent of time per se and dependent on voltage amplitude.

It should also be noted that timing lines can be added to the structure by applying timing input pulses controlled by the ramp generator to the output amplifier. These may be spaced at any convenient scale by divider and multiplying networks.

It has been common practice in the past to include a galvanometer connected to the seismic input signal. The construction of such galvanometer most often included a D'Arsonval type movement, a light source, and a mirror, whereby ribbons of light reflected from the galvanometer mirror was reflected to a light sensitive recording paper. A description of such an instrument is shown on page 817 of Exploration Geophysics by J. J. Jakosky, second edition.

The shortcomings of such a device are the extremely delicate galvanometers required and the large numbers of these galvanometers that are required for multiple channel operation.

The mechanical-optical arrangement described below overcomes these two shortcomings and it is completely compatible with all three types of displays created by the electronic displaying apparatus described above.

Figure 10:
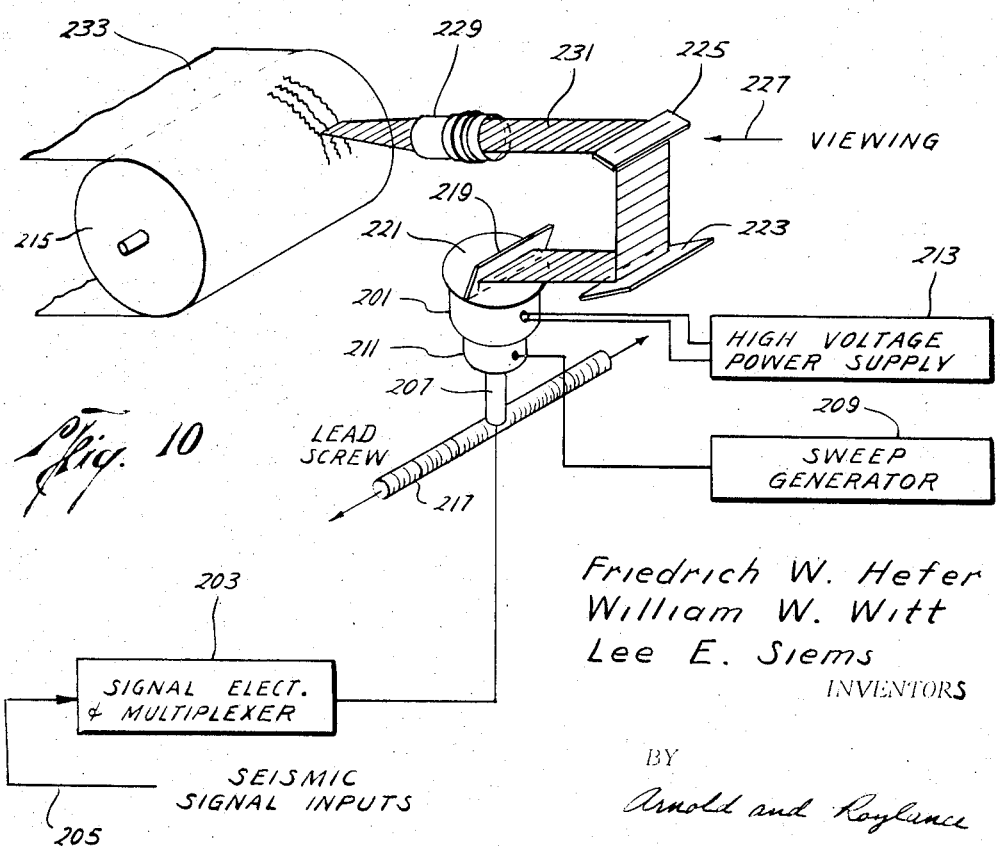
FIG. 10 is a partial pictorial plan view of one embodiment of the invention.

FIG. 10 shows a simplified block diagram of an optical display and recording unit for making a permanent seismogram record of the plurality of traces appearing on the face of oscilloscope 201. The oscilloscope receives its image for display purposes from the signal electronics and multiplexer equipment 203, in turn, which may be connected to the group of seismic input signals 205. The output from multiplexer equipment 203 is applied to a control grid 207 of oscilloscope 201. Sweep generator 209 connected to a deflection yoke, normally horizontal deflection yoke 211, causes the image to be displayed on the face of oscilloscope 201. The brightness of the display may be controlled by high voltage power supply 213 connected to the post-anode of the oscilloscope.

Oscilloscope 201 is positioned in fixed position with respect to paper drum 215, which eventually receives the display traces. One convenient means of mounting oscilloscope 201 with respect to the paper drum is via a lead screw 217 connected to the same equipment unit (not shown) to which the paper drum is attached.

The oscilloscope is spring loaded against a mirror 219, which is positioned at an approximate 45-degree angle with respect to face 221 of oscilloscope 201. The image emanating from the face of the oscilloscope is of sufficient illumination that the mirror readily reflects the image and projects it to a second mirror 223. Bias control 68 (FIG. 8) may be adjusted to increase the intensity of the overall image, and hence the illumination from the face of the oscilloscope, if required.

Second mirror 223 is also placed at an approximate 45-degree angle with respect to the image reflected from first mirror 219, so that it in turn projects the image to a third mirror 225, which is the viewing mirror.

Viewing mirror 225 is likewise at an approximate 45-degree angle with respect to the incoming light beam received from the mirror 223. This position reflects the image through the lens system onto the recording medium.

Mirror 225 may be rotatable to allow the operator to turn the mirror to view the image reflections on the face of the oscilloscope. Then the mirror may be returned to the position of use, such that the image is reflected toward the recording medium.

The 45 degrees angular placements indicated above are not at all rigid, but may be any convenient angles compatible with the position of the oscilloscope and the recording medium.

The signal from mirror 225 is projected toward lens 229, which sharply focuses the light beam 231 received from mirror 225 to make a clear presentation on the paper drum. This means that the surface of the paper drum ideally is located at the real foci of lens 229.

The recording medium, such as paper 233 passing over the paper drum 215, is driven at a constant speed via a drive mechanism (not shown) attached to the axis of drum 215. The surface of paper 233 is light sensitive so that the display image projected thereon is permanently recorded.

In interpreting seismograms it is not uncommon to project a series of traces from geophones positioned along one path from the shot station on one display and to subsequently display a series of traces from another group of geophones positioned along another path from the same shot station. In order to accomplish this with the equipment shown in FIG. 10, after a record has been made in accordance with the procedure described above, the oscilloscope may be repositioned at a new fixed position via lead screws 217, thereby establishing the reflected image at a new location on paper 233. Time base settings for the two groups of signals may be synchronized so that all of the signals have essentially the same time base for comparison and interpreting purposes.

Other groups of geophone signals along other paths from the shot station may be similarly recorded along side those previously recorded on paper 233.

Figure 11:
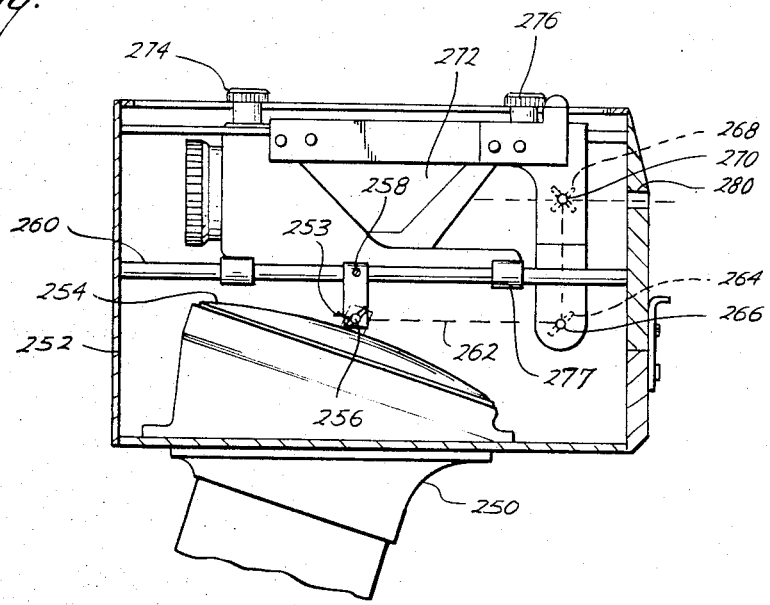
FIG. 11 is a cross-sectional side view of the optical head of one embodiment of the invention.
Figure 12:
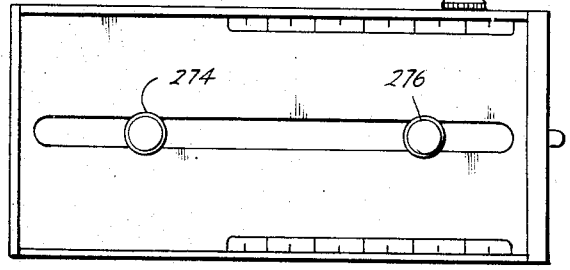
FIG. 12 is a top view of the optical head of one embodiment of the invention.

One form of the optical head assembly that may be used is shown in FIG. 11. Oscilloscope 250 is embraced by the lower portion of the housing 252, which also encloses the mirror and lens assemblies. First mirror 253 is positioned opposite the center of the face 254 of oscilloscope 250 and is pivoted by locking screws 256. Mirror 253 is of sufficient length to extend completely across the entire surface of the oscilloscope, although the mirror is very narrow such that little more than a spot projection from each of the traces is received at any one time on the face of the mirror. Locking screws 256 may be adjusted very tightly to hold the mirror in a fixed position once the entire optical system is aligned. Housing 258 which secures mirror 256 in place may be merely two arms projecting down each side of the mirror connected to rods 260, which are parallel to the light beam as it is projected onto the recording paper and which are affixed to housing 254. The only requirement is that mirror 253 must be positioned so that it is located across the entire group of traces displayed on the face of the oscilloscope.

The image 262 projected from mirror 256 is received by a second mirror 264, which is also held at an adjustable angle via locking screws 266. A third mirror 268 is positioned directly in line of the reflected image from mirror 264. This mirror is likewise secured to the housing 252 via locking screws 270, in a manner similar to mirrors 256 and 264.

In the position of use, mirror 268 is positioned at an angle which will project the reflected image from mirror 266 through a lens assembly 272, which, in turn, projects the image onto the surface of the recording medium.

Focus for the lens assembly is accomplished via lens position knob 274, which moves the lens longitudinally with respect to the light beam from mirror 268. Lens housing slides 277 attached to lens 272 may be secured to rods 260 to provide for this movement.

Similarly knob 276 provides the positioning of mirrors 268 and 264, which may be secured together as a unit, longitudinally with respect to the light beam to the recording medium. By adjusting knobs 274 and 276, the image on the face of the recording medium may be made very sharp and distinct.

For alignment purposes mirror 268 may be rotatably adjustable. When the mirror is made adjustable, a rear viewing knob 278 is attached to the side of the housing 252 and secured to the mirror 268 so that by manipulating knob 278 the mirror 268 may be rotated. A slot 280 at the rear of housing 252 will give the viewer a direct view of the image which is on the face of the oscilloscope. When the observer is satisfied that the image is correct, then mirror 268 may be rotated back into position of use, whereby it projects the traces through lens 272 onto the face of the recording means.

It should be noted that oscilloscope 270 is not placed in a precise vertical position with respect to the housing 252, but rather slightly at an angle thereto. This means that the mirrors will not all be at exactly 45-degree angles, as would be the case if the oscilloscope was at a 90-degree position with respect to the light beam reflected to the surface of the recording medium. But, since the mirror positions are readily adjustable, the precision installation of oscilloscope 250 is not necessary and if other considerations are important, such as mechanical savings of space, the oscilloscope may be set at a different angle.

It should be noted that through the mirror and lens system a reversed image may be achieved, depending upon the number of and placement of the lens or lenses in the assembly. It is not normally important whether or not the image traces are reversed since the entire image would be so reversed and the traces would keep their same relationship to one another. So long as the viewer knows which trace on the record corresponds to which geophone trace, then there is no difficulty in interpreting the overall seismogram representation, regardless of whether the traces are reversed or not.

While various modifications of the invention have been described, it is obvious that various additional modifications and substitutions of structure may be made without varying from the scope of the invention.

What is claimed is:

1. An electronic camera for displaying a seismographic signal, comprising:
   an oscilloscope including an orthogonal deflection element and a control grid,
   a ramp generator producing a repetitive cycle ramp sawtooth signal, the leading edge of which rises substantially instantaneously and the trailing edge of which descends at a substantially constant rate,
   means coupled to said generator for applying said signal to said orthogonal deflection element,
   an output amplifier connected to said control grid, the output D-C level from said amplifier determining the intensity of the display on the face of said oscilloscope,
   means for selectively applying an A-C seismic voltage to said output amplifier for discreetly changing the amplitude of the output of said amplifier while it is conducting, and hence the intensity of the display on the face of said oscilloscope, in proportion to the amplitude of said seismic voltage,
   first start position gate means receiving said sawtooth signal and said seismic voltage, said gate means becoming operative at a position on the trailing edge of each successive sawtooth cycle, and said position being determined by the amplitude of said seismic voltage for each successive cycle of said sawtooth signal,
   differentiating means connected to said start position gate means for producing a pulse upon the operation of said start position gate means,
   trace width control means triggered by said pulse from said differentiating means and producing an output as long as said pulse remains above a triggering amplitude, said output from said trace width control means being applied to said output amplifier to cause said amplifier to conduct, and
   said output amplifier producing a voltage suitable for displaying a seismographic signal on the face of said oscilloscope when said seismic voltage is correlated with successive voltage cycles of said ramp sawtooth signal.

2. An electronic camera in accordance with claim 1, and further including:
   another output amplifier connected to said control grid of said oscilloscope, the D-C level from said another amplifier determining the intensity of the display on said oscilloscope,
   means for selectively applying another A-C seismic voltage to said output amplifier for discreetly changing the amplitude of the output of said amplifier while it is conducting, and hence the intensity of the display on the oscilloscope, in proportion to the amplitude of said another seismic voltage,
   another start position gate means receiving said sawtooth signal and said another seismic voltage, said another gate means becoming operative at a position on the trailing edge of each successive sawtooth cycle subsequent to the position of operation of said first start position gate means as varied by said another seismic voltage on successive cycles of said sawtooth signal,
   another differentiating means connected to said another start position gate means for producing a pulse upon the operation of said another start position gate means,
   another trace width control means triggered by said pulse from said another differentiating means for producing an output as long as said pulse remains above a triggereing amplitude, said output from said another trace width control means being applied to said another output amplifier for causing said amplifier to conduct,
   said another amplifier producing a voltage suitable for displaying a seismographic signal on the face of said oscilloscope in the form of a wiggle trace pattern produced by the correlation between successive voltages occurring with successive cycles of said ramp sawtooth signal and the output voltage from said first output amplifier.

3. An electronic camera for displaying a seismographic signal in accordance with claim 1 and further including:
   a mirror system aligned opposite to the face of said oscilloscope for receiving the projected image therefrom,
   a lens positioned near said mirror system for receiving the projected image from said mirror system and focusing said image, and
   light sensitive permanent recording means moving at a substantially constant velocity positioned at the point of real focus of said lens for making a permanent record of said image on said recording means.

4. An electronic camera for displaying a seismographic signal in accordance with claim 2 and further including:
   a mirror system aligned opposite the face of said oscilloscope for receiving the projected image therefrom,
   a lens positioned near said mirror for receiving the projected image from said mirror system and focusing said image, and
   light sensitive permanent recording means moving at a substantially constant velocity located at a point of real focus from said lens for making a permanent record of the image on said recording means.

5. An electronic circuit for displaying and recording a seismographic signal, comprising:
   an oscilloscope including an orthogonal deflection element and a control grid,
   a ramp generator producing a repetitive cycle ramp sawtooth signal, the leading edge of which rises substantially instantaneously and the trailing edge of which descends at a substantially constant rate,
   means coupled to said generator for applying said signal to the orthogonal deflection element,
   an output amplifier connected to said control grid, the output D-C level from said amplifier determining the intensity of the display on said oscilloscope,
   means for selectively applying an A-C seismic voltage to said output amplifier for descreetly changing the amplitude of the output of said amplifier while it is conducting, and hence the intensity of the display on the face of said oscilloscope, in proportion to the amplitude of said seismic voltage,
   start position gate means receiving said sawtooth signal, said signal causing said gate means to operate at the same position on the trailing edge of each successive cycle of said sawtooth signal as determined by an adjustable bias setting for said start position gate means,
   combination control means having an input connected to said start position gate means and an output connected to said output amplifier, said control means providing an output signal to said amplifier to cause conduction of said amplifier upon operation of said start position gate means,
   stop position gate means receiving said sawtooth signal and operating at a position on the trailing edge of each successive cycle of said sawtooth signal as determined by an adjustable bias setting for said stop position gate means, said stop position gate means being connected to said combination control means for terminating the signal from said control means, and hence conduction of said amplifier, upon operation of said stop position gate means, whereby a voltage is provided by said output amplifier which causes an image on the face of said oscilloscope produced by the correlation between successive voltages occuring at the output of said amplifier with successive cycles of said ramp sawtooth signal.

6. The electronic circuit of claim 5 and further including:

a mirror system aligned opposite to the face of said oscilloscope for receiving the projected image therefrom, a lens positioned near said mirror for receiving the projected image from said mirror system and focusing said image, and light sensitive permanent recording means moving at a substantially constant velocity positioned at the point of real focus of said lens for making a permanent record of said image on said recording means.

7. An electronic circuit in accordance with claim 6 and further including:

means including bias means applying an adjustable bias and said seismic voltage to said stop position gate means thereby selectively initiating the operation of said stop position gate means on successive trailing edges of said sawtooth signal in dependence upon the amplitude of said seismic voltage.

8. An electronic circuit for displaying and recording a seismographic signal, comprising:

an oscilloscope including an orthogonal deflection element and a control grid, a ramp generator producing a repetitive cycle ramp sawtooth signal, the leading edge of which rises substantially instantaneously and the trailing edge of which descends at a substantially constant rate, means coupled to said generator for applying said signal to the orthogonal deflection element, an output amplifier connected to said control grid, the output D-C level from said amplifier determining the intensity of the display on said oscilloscope, start position gate means receiving sail sawtooth signal, said signal causing said gate means to operate at the same position on the trailing edge of each successive cycle of said sawtooth signal as determined by an adjustable bias setting for said start position gate means, combination control means having an input connected to said start position gate means and an output connected to said output amplifier, said control means providing an output signal to said amplifier to cause conduction of said amplifier upon operation of said start position gate means, stop position gate means receiving said sawtooth signal and operating at a position on the trailing edge of each successive cycle of said sawtooth signal as determined by an adjustable bias setting for said stop position gate means, said stop position gate means being connected to said combination control means for terminating the signal from said control means, and hence conduction of said amplifier, upon operation of said stop position gate means, whereby a voltage is provided by said output amplifier which causes an image on the face of said oscilloscope produced by the correlation between successive voltages occurring at th output of said amplifier with successive cycles of said ramp sawtooth signal.

9. The electronic circuit of claim 8 and further including:

a mirror system aligned opposite to the face of said oscilloscope for receiving the projected image therefrom, a lens positioned near said mirror for receiving the projected image from said mirror system and focusing said image, and light sensitive permanent recording means moving at a substantially constant velocity positioned at the point of real focus of said lens for making a permanent record of said image on said recording means.

10. An electronic circuit in accordance with claim 9 and further including:

means including bias means applying an adjustable bias and said seismic voltage to said stop position gate means thereby selectively initiating the operation of said stop position gate means on successive trailing edges of said sawtooth signal in dependence upon the amplitude of said seismic voltage.

References Cited

UNITED STATES PATENTS

| 3,129,999 | 4/1964 | Brown et al. | 346—109 |
| 3,158,433 | 11/1964 | Alexander et al. | 346—110 |
| 3,173,743 | 3/1965 | Weissensteiner | 346—33 |
| 3,184,735 | 5/1965 | Chapman et al. | 346—110 XR |
| 3,193,838 | 7/1965 | Mitchell | 346—110 |
| 3,243,820 | 3/1966 | Alexander | 346—109 |

RICHARD B. WILKINSON, *Primary Examiner.*

J. W. HARTARY, *Assistant Examiner.*